United States Patent [19]
Davis et al.

[11] 3,944,487
[45] Mar. 16, 1976

[54] CATALYTIC FILTERING-INCINERATING PROCESS AND DEVICE FOR WASTE WATER

[75] Inventors: Delmar B. Davis; Wendell N. Christensen, both of Brigham City, Utah

[73] Assignee: Thiokol Corporation, Newtown, Pa.

[22] Filed: Dec. 4, 1974

[21] Appl. No.: 529,653

Related U.S. Application Data

[63] Continuation of Ser. No. 440,101, Feb. 6, 1974, abandoned, which is a continuation-in-part of Ser. No. 304,165, Nov. 6, 1972, abandoned.

[52] U.S. Cl.................. 210/62; 210/63 R; 210/68; 252/459; 423/473; 423/579
[51] Int. Cl.².......................... B01J 9/04; C02B 1/34
[58] Field of Search............ 210/62, 68, 50, 63, 59; 252/459; 423/579, 502, 500, 473, 474

[56] References Cited
UNITED STATES PATENTS

| | | | |
|---|---|---|---|
| 1,197,640 | 9/1916 | Kriegsheim | 210/62 |
| 3,509,835 | 5/1970 | Dibelius et al. | 210/68 |
| 3,637,529 | 1/1972 | Van Beek et al. | 252/459 |
| 3,673,115 | 6/1972 | Linsen et al. | 252/459 |

*Primary Examiner*—Charles N. Hart
*Assistant Examiner*—Benoit Castel
*Attorney, Agent, or Firm*—Stanley A. Marcus; Edward E. McCullough

[57] ABSTRACT

The pollutants are oxidized with oxygen atoms obtained from catalytic decomposition of hypochlorite ions and are filtered out and entrapped on the catalytic material of the filter bed as the waste water flows through the bed. The catalytic material catalyzes the incineration of the trapped pollutants by an oxidizing gas which flows through the bed of the catalyst and which regenerates the catalyst.

4 Claims, No Drawings

CATALYTIC FILTERING-INCINERATING PROCESS AND DEVICE FOR WASTE WATER

CROSS REFERENCE TO RELATED APPLICATION

This application is a continuation of application Ser. No. 440,101 "Catalytic Filter Incinerator" by D. B. Davis, et al., filed Feb. 6, 1974, now abandoned, which was a continuation-in-part of Ser. No. 304,165 "A Catalytic Filter Incinerator" by D. B. Davis, et al., filed Nov. 6, 1972, now abandoned.

BACKGROUND OF THE INVENTION

1. Field of the Invention

A catalytic filtering and incinerating process and device, specifically, one using a regenerative catalytic material which catalyzes the decomposition of hypochlorite ions into oxygen atoms for oxidizing pollutants in aqueous solutions, which filters out and entraps large pollutants, which catalyzes the burning of these entrapped pollutants, and which regenerates during burning.

2. Description of the Prior Art

The method of removing pollutants from waste water by flowing the water through a bed of non-combustible granular material which filters out and entraps pollutants and then incinerating the bed to burn off the pollutants was improved by N. R. Dibelius et al. as described in U.S. Pat. No. 3,509,835 by heating the bed internally, by agitating it during filtering, and by using a second source of oxidizing gas with a second bed of catalytic material to catalyze the burning of the combustion gases.

The present invention further improves the rate and manner of removing pollutants from waste water by simultaneously oxidizing these pollutants with oxygen atoms from the catalytic decomposition of hypochlorite ions while filtering the water, and by catalytically incinerating these filtered pollutants.

SUMMARY OF THE INVENTION

The improved process for removing pollutants from waste water uses a granular, porous, regenerative, catalytic material of oxides of at least one metal selected from nickel, cobalt, iron, iridium, and mixtures thereof formed by oxidizing these metals when placed within the pores of aluminas having openings from 80 to 1000 angstroms, or molecular sieves with channels having openings from 8 to 40 angstroms. The waste water which is prescreened to remove foreign objects such as razor blades, toothpaste tubes, wood, etc., and to which hypochlorite ions are added is flowed through at least one bed of this catalytic material. The catalytic material filters out and entraps pollutants, while simultaneously catalyzing the decomposition of hypochlorite ions into oxygen atoms which oxidize the pollutants as the water flows through the bed. After a pre-determined time, oxidizing gas containing oxygen is flowed through the bed and incinerates the entrapped pollutants. The catalytic material catalyzes the incineration of these entrapped pollutants and regenerates itself by means of the oxidizing gas. This results in a more rapid removal of the pollutants and a greatly extended bed life.

DESCRIPTION OF THE PREFERRED EMBODIMENTS

The polluted water or waste water, terms which refer to water containing suspended and dissolved, oxidizable and unoxidizable, inorganic and organic pollutants, bacteria, viruses, and other waste pollutants which range in size from large particles to colloidal particles to molecules and ions, is initially prescreened to remove foreign objects such as toothpaste tubes, razor blades, glass, etc. which ocassionally occur in polluted waters. Hypochlorite ions are put into the water by conventional means such as electrolytic generation from chloride ions or by addition of hypochlorite salts. The water is flowed through a bed or granular, non-combustible, porous, regenerative catalytic material which filters out and entraps the larger size pollutants, which permits the movement of water molecules, hypochlorite ions, molecules, ions and colloidal pollutants into and from the catalyst pores to the sites that catalyze the decomposition of hypochlorite ions into oxygen atoms that oxidize the pollutants to harmless products, so that as the waste water flows through the bed, the atomic to colloidal size pollutants are oxidized by oxygen atoms obtained from the catalytic decomposition of the hypochlorite ions, while the larger than colloidal size pollutant particles are simultaneously filtered out and entrapped on the granules of the catalyst. When a sufficient amount of water has flowed through the bed as determined by bed size, amount of pollutants, back pressure, etc. the flow is stopped, and an oxidizing gas containing oxygen such as air or oxygen enriched air is flowed through the bed, preferably, at temperatures from 800° to 1200°F. This temperature can be achieved by means such as external heaters, heaters embedded within the bed, preheated gas, or mixing the gas with fuels and burning it. During the flow of th oxidizing gas, the entrapped pollutants are incinerated, and the catalytic material catalyzes this incineration. The catalytic material regenerates during incineration, and withstands sintering, that is, closing of its pores during incineration. The flow of gas is stopped and the steps are repeated as necessary to reduce the pollutants to a predetermined level. The arrangement of the beds of materials, size of material, as well as other parameters are adjusted to the specific type of waste water used.

The following examples illustrate the invention. Examples 1 and 2 show the difference in removing pollutants from polluted water when hypochlorite ions and a catalytic filter bed is used, and Example 3 shows the difference in incineration time of particles entrapped on the filter bed when catalytic material is used.

EXAMPLE 1

A 1.5 gallon sample of raw sewage, that is waste water containing fecal matter, particles of paper, urine, etc., was treated with 2,500 ppm of NaClO for 30 minutes. This sample was then passed through an upright filter bed made up of 25 mesh granular catalyst particles, of oxides of cobalt (5 weight per cent) and oxides of nickel (10 weight per cent) supported on activated alumina having a pore size of 120 angstroms, and designated as TC catalyst. The bed was 1.5 inches in diameter and 18 inches in length. The flow rate was approximately 10.5 cubic inches per minute. The filter bed temperature was maintained at a temperature from 900° to 1000°F, and air was flowed through the filter bed for 20 minutes. The filter bed was again used to treat a second sample of sewage as above and no change in filtering was observed.

The raw sewage has a suspended solids (SS) value of 458 mg/l, of COD of 952 mg/l and a BOD of 405 mg/l. The suspended solids, COD and BOD values were measured as described in "Standard Methods for Examination of Water and Waste Water", 12 ed. Amer. Pub. Health Assn. New York, 1965. After the simultaneous step of filtering and oxidizing with the catalyst filter bed, the SS value was 0, the BOD value was 50 mg/l, and the COD was 404. This represented a change of 100 per cent in the SS value, a 58 per cent change in the COD value, and a change of 88 per cent in the BOD value.

EXAMPLE 2

This example shows the effect of filtering without simultaneously oxidizing the oxidizable pollutants in the waste water.

In this example, the sewage sample was not pretreated with hypochlorite ions. The sample was filtered as in Example 1, and the trapped material was incinerated as in Example 1. The change in the suspended value was 53 per cent, the change in the COD was 30 per cent, and the change in the BOD was 23 per cent. Thus to achieve the same result in Example, the filtering step would have to be repeated about 5 times.

The following example shows the catalytic burning of the entrapped pollutants by a filter bed formed of catalytic substrates.

EXAMPLE 3

Two incinerators were set up, one filled with the TC catalyst substrate particles and the other filled with the support substrate particles only. Five milliliters of sewage per 15 grams of the substrates were allowed to impregnate the beds. Air was flowed through the incinerators at the same rate and the beds were heated to the same temperature. The exit gas was collected and analyzed for carbon dioxide. The total amount of carbon dioxide collected at 800°F for the TC catalyst filter medium was 50 mg at 60 minutes. The non-catalytic substrate yielded 18 mg at 60 minutes. At 1000°F the TC catalyst filter medium had a total of 70 mg of $CO_2$ at 60 minutes, the non-catalytic substrate had 25 mg at 60 minutes. Thus the time for incineration is reduced over 60 per cent when using the catalytic substrates.

The catalysts formed as described in U.S. Pat. No. 1,197,640 are not suitable because their activity decreases rapidly with time or ceases altogether. The reason for this occurrence is not understood at this time, but may be caused by formation of chemical bonds between oxidized products of the pollutants which block the catalyst sites and prevent formation of oxygen atoms, or that during incineration other chemical oxides form which prevent catalytic activity. It was discovered that catalytic materials processed as described below continue their activity for long periods of time. This may come from the formation of complex metal alumina oxides or silica oxides within the pores of the substrates under the processing conditions described. The catalytic material is formed by placing the metal within the pores, and oxidizing the metal at temperatures from 550° to 900°F with a gas containing oxygen. One method is by dipping particles of the substrate in solutions which have from 20 to 30 weight per cent of one or more oxidizable salts of the metals of cobalt, nickel, iridium, iron, or mixtures thereof, such as nitrates or chlorides, preferably using from 70 to 80 grams of support per 100 grams of solution, draining the wetted particles of excess solution, heating the wetted particles in a gas containing oxygen such as air, or oxygen enriched air, or their equivalents at temperature from 550° to 900°F, preferably from 600° to 725°F, to form the metal oxides, and repeating the above steps a number of times until the weight of oxides of metal to support is within the range from 3 to 30 weight per cent, and preferably from 8 to 12 weight per cent when the oxides are those of cobalt. The granular size of the catalytic material is adjusted to the flow rate desired and amount of pollutants present as well as the size of the bed.

Filtering incinerator devices as described in U.S. Pat. No. 3,509,835 by N. R. Dibelius et al are greatly improved when the granular filter bed described therein is replaced with the granular catalytic material of this invention, and means for putting hypochlorite ions into the waste water, are connected to the waste water inlet means, or to the device itself.

The invention as described is not to be limited by the examples only but also by the claims as set forth below.

We claim:

1. The method for destroying oxidizable pollutants of atomic to colloidal size in water, comprising the steps of:

adding hypochlorite ions to the water;

flowing the water through a filter bed of particulate, porous, refractory, substrate material containing catalytic material composed of oxides of at least one metal selected from the group consisting of nickel, iron, cobalt, iridium, and mixtures thereof, said oxides formed at temperatures from 550° to 900°F in the presence of a gas containing oxygen, and within the pores of said substrate, wherein said substrate is selected from aluminas having an average pore diameter within the range from 80 to 100 angstroms, and molecular sieves with channels having an average opening from 8 to 40 angstroms, whereby the metallic oxides catalyze decomposition of the hypochlorite ions to produce atomic oxygen, which oxidizes at least some of the pollutants into harmless products;

draining the filtered water from the filter bed;

heating the filter bed to above 900°F; and forcing oxygen-containing gas through the filter bed, whereby any remaining pollutants entrapped by the filter bed are incinerated, the filter bed is cleaned, and the metal-oxide catalysts are refurbished.

2. The improved process as recited in claim 1 wherein the oxides are oxides of cobalt.

3. The improved process as recited in claim 1 wherein the oxides are oxides of nickel.

4. The improved process as recited in claim 1 wherein the oxides are oxides of iridium.

* * * * *